April 19, 1966    W. S. PRAEG ETAL    3,247,301
METHOD OF MAKING GEAR FINISHING TOOLS
Filed Sept. 17, 1962    2 Sheets-Sheet 1

INVENTORS
WALTER S. PRAEG
JOHN J. SIGMAN JR.
BY
ATTORNEYS

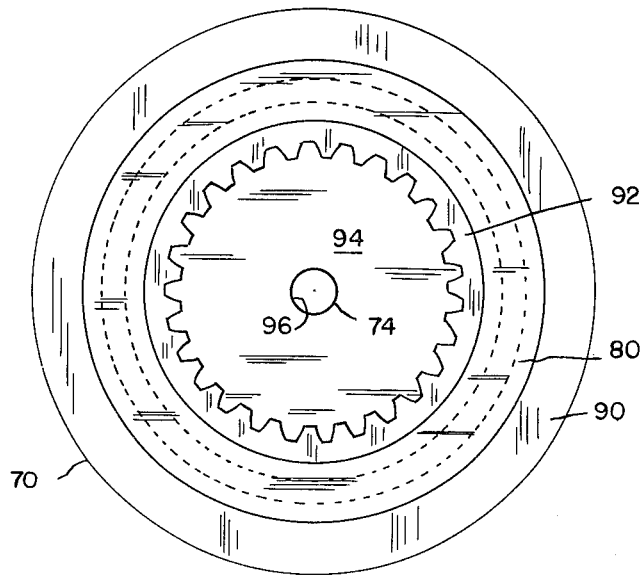
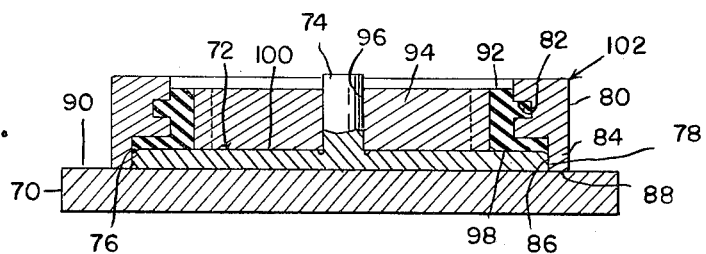
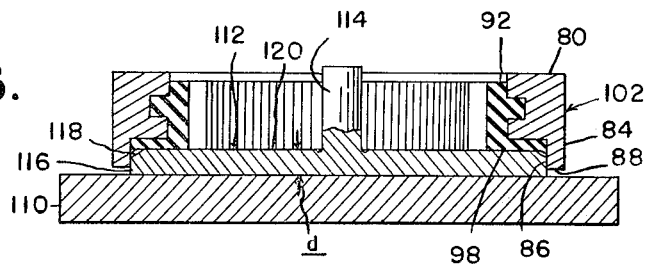
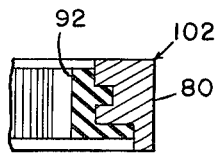

United States Patent Office 3,247,301
Patented Apr. 19, 1966

3,247,301
METHOD OF MAKING GEAR FINISHING TOOLS
Walter S. Praeg and John J. Sigman, Jr., Detroit, Mich., assignors to National Broach & Machine Company, Detroit, Mich., a corporation of Michigan
Filed Sept. 17, 1962, Ser. No. 224,020
8 Claims. (Cl. 264—225)

The present application is a continuation-in-part of our prior copending application Serial No. 793,632, filed February 16, 1959, which in turn is a continuation-in-part of our prior application Serial No. 646,782, filed March 17, 1957 (now abandoned).

The present invention relates to a method of making gear finishing tools.

The invention relates particularly to the manufacture of a new type of gear finishing tool identified as a hone. Such a tool is in the form of a gear and is designed to be run in mesh with a gear to be finished, ordinarily with the axes of the gear and tool crossed at a small angle, preferably but not necessarily between three and thirty degrees. The operation is carried out by driving either the gear to be finished or the hone directly and causing it to drive the other of the members. Working pressure between the surfaces of the teeth of the hone and the gear may be developed by opposing rotation of the driven member, such for example as with a brake, or in some cases by providing a predetermined controlled radial pressure between the gear and hone.

The hone is particularly effective in removing minor imperfections such as nicks in the teeth of the gear, although it is also useful in performing some corrections to the entire tooth surface. The hone finds its greatest utility in a final finishing operation performed on the teeth of hardened gears, an operation which prior to the development of gear hones, was performed only imperfectly by lapping or grinding.

The success of the gear honing operation depends primarily upon the nature of the gear hone. This hone has at least the tooth portions thereof formed of a relatively hard, strong but slightly resilient plastic material having abrasive grit or grains embedded therein. While other resins having the requisite physical properties may be employed, completely satisfactory results at the present time have been obtained by the use of a plastic compound employing epoxy resin. This resin, which may be compounded to set up or cure by chemical action without the application of heat, is dimensionally stable and permits casting or molding of the gear-like hone with an accuracy which reproduces a master gear substantially exactly. After curing, it is impossible to finish or machine the teeth of the hone by commercially practicable methods. Accordingly, it is essential to provide a method of molding or casting the hones which will produce an accurately formed hone without requiring operations subsequent to removal from the mold.

With the foregoing general remarks in mind, it is an object of the present invention to provide a complete method of making gear-like hones characterized by the facility with which exceptionally accurate reproductions of a master gear may be reproduced, maintaining accuracy as to the characteristics, tooth spacing, eccentricity, and surface finish.

It is a further object of the present invention to provide a method of molding or casting the tooth portions of gear hones characterized by its ability to maintain concentricity of the finished hone with exceptional accuracy.

More specifically, it is an object of the present invention to provide a method of molding or casting at least the tooth portions of gear hones comprising providing a fixed locating pilot in a receptacle, placing a master gear on the pilot to define with the side walls of the receptacle an annular space, filling the space with uncured plastic material, curing the plastic material, removing the master gear, and employing the cured plastic material as a portion of a mold cavity in casting or molding gear-like gear finishing hones therein.

Other objects and features of the invention will become apparent as the description proceeds, especially when taken in conjunction with the accompanying drawings, illustrating preferred embodiments of the invention, wherein:

FIGURE 10 is a vertical sectional view through the mold assembly used in casting the hone mold from a master gear.

FIGURE 11 is a plan view of the assembly illustrated in FIGURE 10.

FIGURE 12 is a sectional view of the mold ring assembly produced by the operation illustrated in FIGURE 10.

FIGURE 13 is a vertical sectional view through the mold assembly using the hone mold ring for casting gear-like hones.

Figure 1:
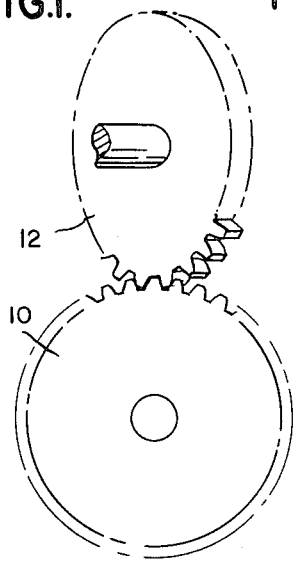
FIGURE 1 is a diagrammatic view illustrating the relationship between a hardened work gear to be finished and a gear-like hone.
Figure 2:
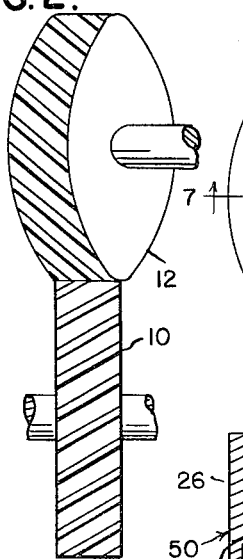
FIGURE 2 is a diagrammatically presented side elevation of the gear and tool shown in FIGURE 1.
Figure 6:
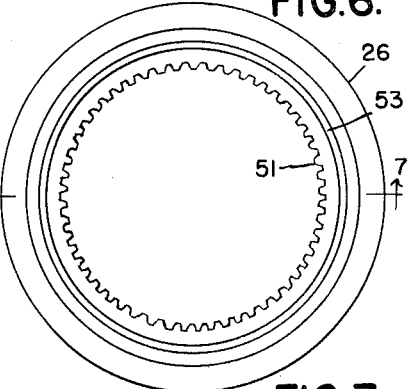
FIGURE 6 is a plan view of a completed plastic master mold.
Figure 7:
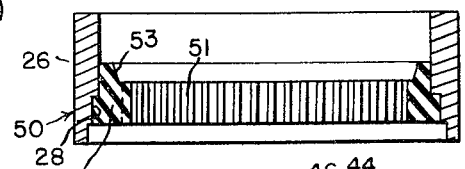
FIGURE 7 is a sectional view on the line 7—7, FIGURE 6.

Referring first to FIGURES 1 and 2 there is illustrated the relationship between a work gear 10 and a gear-like gear finishing hone 12 during the finishing operation. From these figures it will be observed that the hone is positioned in mesh with the work gear with the axes of the gear and hone crossed in space at a small angle. This crossed axes relationship, as is now well understood, results in a component of relative motion between engaging surfaces of the gear and hone which extend generally longitudinally of the teeth, and which is substantially uniform from top to bottom of the teeth. This is to be contrasted with the relative motion or rubbing action developed between involute teeth of gears at parallel axes, in which case the relative motion or rubbing action varies substantially and is in theory zero at the pitch line.

Either the gear 10 or the hone 12 is positively driven in rotation, the other member being driven thereby. The pressure contact is provided and controlled by opposing rotation of the driven member or in some cases by a controlled radial pressure between the members.

In order to provide true meshing action between the gear and hone with their axes crossed in space, it is of course apparent that the helix angle of the teeth of the hone must be different from that of the teeth of the work gear by an amount and in a direction appropriate to produce the required meshing action.

If the teeth of the hone are of uniform cross-section from end to end, then in theory the contact between each tooth surface of the hone and the adjacent tooth surface of the work gear is a point contact. In practice, this contact of course extends over a limited area. However, in order to produce accurate finishing action of the teeth of the gear from end to end so as to produce a uniform tooth thereon, a relative translation between the gear and tool is provided in a plane which is parallel to the axes of both the gear and tool and which is in a direction in such plane transversely to the axis of the tool or hone. In many cases this relative traverse is accomplished by traversing the work gear parallel to its own axis. In other cases the relative traverse is carried out in a manner referred to in the art as "diagonal traverse" in which case the direction of relative traverse in the aforesaid plane makes a substantial angle in space to the axes of both the gear and tool. Relative rotation between the gear and tool is carried out at substantial speeds. For example, good results have been obtained when the speed of rotation is such as to produce a pitch line velocity in the neighborhood of 2000 feet per minute.

Figure 3:
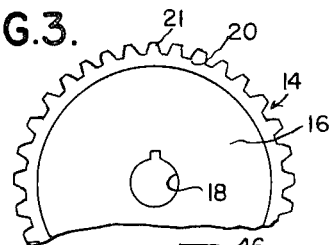
FIGURE 3 is an elevational view of a gear-like finishing hone employed in finishing hard gears.

Referring now to FIGURE 3 there is shown a gear hone 14 including a generally annular central core portion 16 provided with a keyed opening 18. Surrounding the core 16 is an annular body 20 of relatively hard, strong but slightly yieldable and perfectly resilient plastic material. The outer portion of the annular body 20 is formed to provide gear-like teeth 21. The teeth 21 have abrasive grits or grains embedded therein. The size of the grains depends upon the specific action desired, coarser grains being employed for more rapid removal of stock, and finer grains being employed in a fine finishing operation. Excellent results have been obtained when grains of Carborundum are employed having a grit size, preferably but not necessarily, between 40 and 120 grit. The action appears to be that the individual grits are strongly but slightly resiliently supported in the plastic material so that when strained unduly, instead of fracturing or being broken out of the supporting resin, they yield slightly, and when the stress is removed they return uninjured to precisely the position previously occupied.

The present invention accomplishes the formation of the plastic portion 20 of the hone with great accuracy, effecting substantial duplication of a master gear as to accuracy, tooth characteristics, and surface finish. In addition, the method is effective to maintain concentricity of the opening 18 with the exceptional accuracy required in a highly accurate gear finishing tool.

Referring now to FIGURES 4-9 the steps of the method will be described.

Figure 5:
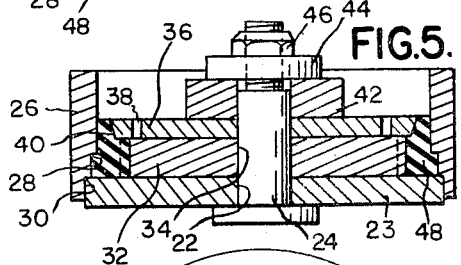
FIGURE 5 is a section on the line 5—5, FIGURE 4.
Figure 4:
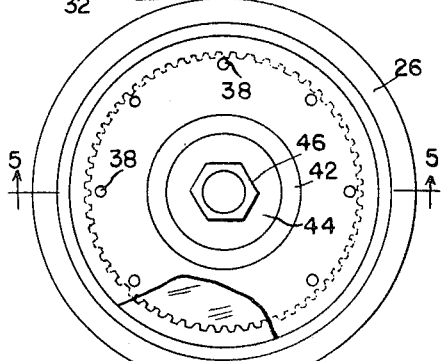
FIGURE 4 is a plan view of a molding or casting structure used in the production of plastic master mold members.

Referring first to FIGURES 4 and 5 there is shown the molding or casting structure employed in the production of the plastic master mold members, which in turn are used for the production of plastic hones. The structure comprises a bottom plate 23 having an opening 22 located centrally thereof. Extending through the opening 22 is a cylindrical pilot 24 the upper end of which is threaded. A ring 26 is provided having a first annular recess 28 provided to form an interlock with the plastic material of the master element and a second annular recess 30 adapted to fit the plate 23 at its top surface and outer edge.

In the production of the plastic master member which is to be used for the subsequent production of a plurality of plastic hones, a master gear 32 is provided which is finished with the required degree of accuracy to be an exact model or counterpart of the plastic hones to be produced in accordance with the method and apparatus disclosed herein. This gear is preferably of metal and may be cut by usual processes and accurately finished as for example by shaving, grinding, or the like. The master gear is provided with a central opening 34 which is maintained concentric with the master gear to the required high degree of accuracy.

Assembled over the pilot 24 and resting upon the top of the master gear 32 is a cover plate 36 having a plurality of openings 38 extending therethrough. The openings 38 are located radially inwardly with respect to a line tangent to the roots of the teeth of the master gear 32, and hence in this phase of the operation, the openings 38 are closed at their bottoms by uninterrupted side surfaces of the master gear 32.

It will be observed that the periphery of the plate 36 is slightly inclined as indicated at 40 and the peripheral surface of the plate 36 is spaced radially inwardly from the inner surface of the ring 26.

After assembling the plate 36 on the pilot 24 into engagement with the master gear 32 an annular compression ring 42 is assembled over the pilot, after which a washer 44 and nut 46 are added to complete the assembly. Thereafter, a plastic resin compound indicated at 48, is introduced through the annular space between the edge of the plate 36 and the inner surface of the ring 28 so as to completely fill the annular space between the edge of the master gear 32 and the lower portion of the inner surface of the ring 26. This material is distributed uniformly and care is taken to insure that it completely fills the tooth spaces of the master gear. This plastic material is now caused or allowed to set or cure. In some cases the cure is accomplished merely by the passage of time, the compound including chemical curing agents. In other cases the cure is effected by heating, which may also be employed to accelerate the curing attributable primarily to a chemical agent. In any case the parts are maintained as assembled in FIGURE 5 until the annular body 48 is completely cured.

Thereafter, the nut 46, washer 44, and compression member 42 are removed from the pilot 24 and the assembly comprising the ring 26, the plastic body 48, the master gear 32 and the cover plate 36 are removed from the plate 23 and pilot 24. Thereafter, the master gear 32 and cover plate 36 are pressed axially to separate them from the ring 26 and plastic body 48. This leaves the master molding ring 50 as a separate reusable device which is formed by the ring 26 and the plastic master member 48 having internal teeth indicated at 51 which are a substantially exact counterpart of the teeth of the master gear 32. The annular recess 28 at the inside of the ring 26 interfits with the material of the plastic master member as shown and permits separation of the ring 26 and plastic member 48 as a unit from the master gear 32. In addition, separation of the cover plate 36 from the master molding member leaves the conical or beveled surface 53.

The master molding ring 50 may be reassembled as will subsequently appear, with the base plate 23, pilot 24 and cover plate 36, and accordingly, a number of different master molding rings may be produced and stored for use as required. The master molding ring 50 accordingly constitutes a highly useful article of manufacture.

Figure 9:
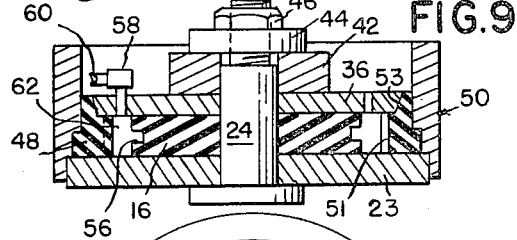
FIGURE 9 is a section on the line 9—9, FIGURE 8.
Figure 8:
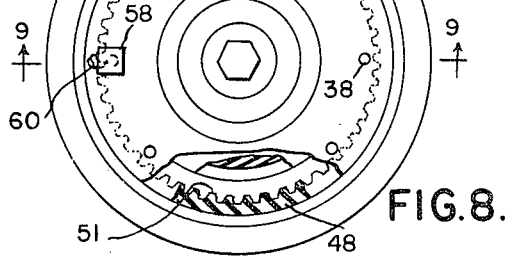
FIGURE 8 is a plan view of the molding or casting structure used in the production of honing tools with a cover in place.

When it is desired to employ the master molding ring 50 for the production of a plastic hone, the assembly illustrated in FIGURES 8 and 9 is produced. In these figures a required master molding ring 50 is assembled on the base plate 23 in the position shown. Mounted on the pilot 24 is an annular core body 16 illustrated as provided with a circumferentially extending groove 56 to interlock with the abrasive material of the hone. The cover plate 36 is reassembled, its beveled edge fitting into the beveled or conical recess 53 provided in the plastic master member 48. At this time however, one of the openings 38 is closed by a fitting 58 adapted to be connected by a conduit 60 to a suitable source of plastic abrasive resin compound. The compression ring 42, washer 44, and nut 46 are reassembled, the nut being tightened down to maintain the cover plate 36 firmly in engagement with the upper surface of the core 16. At this point it may be mentioned that the core may be formed of metal, such for example as cast iron, or it may be formed of other material such for example as a suitable resin compound. It any case the core 16 is provided with an opening fitting with a high degree of accuracy around the pilot 24.

Since the plastic master element 48 was formed in engagement with an accurately centered master gear 32, it will of course be apparent that the teeth 51 of the plastic master member 48 are located with the same degree of accuracy with respect to the pilot 24.

In order to produce the hone illustrated in FIGURE 3, the plastic abrasive compound is introduced into the annular space 62 defined at the bottom by the plate 23, radially outwardly by the toothed surface of the master member 48, at the top by the under surface of the cover plate 36, and radially inwardly by the outer peripheral surface of the core 16.

Plastic material is introduced through the fitting 58 and flows circumferentially around the space 62, expelling air through the remaining openings 38. As the plastic material reaches the openings 38 next adjacent the one carrying the fitting 58, the plastic material starts to flow out of these openings. At this time suitable plugs of plastic material are inserted, the outward flow of plastic material being an indication that air has been expelled from the annular space between the fitting 58 and the next adjacent pair of openings 38.

The operation continues until the plastic material flows out of the next pair of openings, at which time these openings are plugged, until finally plastic material flows out of the openings diametrically opposite the fitting 58.

The assembly as illustrated in FIGURES 8 and 9 is now cured by heating or chemical action or a combination of the two, after which the parts are disassembled, leaving the master molding ring 50 as a separate element to be stored for reuse and the completed hone indicated generally at 14. Curing at 125–150 degrees Fahrenheit for four hours is satisfactory.

It is found that separation between the toothed portions of the master gear 32 and the master molding member 48 on the one hand, and the teeth of the master molding member 48 and those of the abrasive portion 20 of the hone on the other hand, is facilitated if the teeth of the rigid member are treated with a suitable parting agent such for example as wax, before the fluid plastic material is brought into contact therewith.

The plastic material employed in producing the master plastic member 48 is preferably compounded from an epoxy resin and may be identical or substantially identical with the material used in forming the abrasive part of the hone, except that it does not include the abrasive grits or grains used in the operating portion of the hone. On the other hand, the plastic material employed in producing the master molding member 48 may incorporate a certain amount of fine abrasive material to impart abrasion resistance characteristics to the plastic portion of the mold cavity. Excellent results have been obtained employing a compound in which the resin is an epoxy resin, and using a chemical hardener adapted to cause the plastic composition to cure or set up without the application of heat.

With reference to the wax coating of the teeth of the master gear 32 and the teeth 51 of the plastic master member 48, it may be noted that the thickness of the film of wax is so small as to produce no appreciable errors. However, insofar as the wax coating tends to produce errors, these errors cancel out. The wax coating on the teeth of the master gear produces an oversize cavity in the plastic master member 48, the size of which is correspondingly reduced by the wax coating applied to its teeth 51.

It is desired to re-emphasize the fact that the present operation produces a hone formed of a relatively hard although slightly yieldable and resilient resin compound with a sufficient degree of accuracy to permit its use in honing the teeth of hardened gears without any operations on the hone subsequent to its removal form the mold. In essence, a honing tool is produced the toothed portions of which are substantially exactly identical with the toothed portions of a master gear as to surface finish, profile, tooth shape, tooth spacing, concentricity, and other gear characteristics. The honing tools are produced by a casting operation from plastic master members 48. Each of the master elements 48, or more properly the master molding ring 50 including the master molding element 48, may be employed to produce a multiplicity of hones. In like manner, a master gear such as that shown at 32, may be used indefinitely to produce corresponding master molding elements 48. In view of the foregoing, the master gears 32 may be produced with the utmost care and precision, since the cost of each master gear may be amortized over an unlimited number of hones. It is thus possible to produce master gears to the utmost accuracy, with the assurance that the honing tools produced by the method and apparatus disclosed herein will be substantially identical replicas thereof insofar as all significant gear characteristics are concerned.

In order to provide for the greatest degree of accuracy in reproducing the form of a master gear in a gear-like honing tool formed of a resin compound, it is preferred to employ the structure and to follow the sequence of steps which will be described in conjunction with FIGURES 10–13.

The apparatus employed comprises a first mold plate assembly having a base plate 70, a mold plate 72 provided with an upstanding cylindrical post or pilot 74. The mold plate 72 may be permanently connected to the base plate 70 or simply supported thereon. In practice, the base plate 70 is ordinarily of aluminum while the mold plate 72 and the post 74 are formed of steel. The mold plate 72 is of circular shape and its upper outer corner is provided with a relatively small chamfer as indicated at 76. By modern machining methods, it is possible to produce substantially exact concentricity between the outer cylindrical locating surface 78 of the mold plate 72 and the cylindrical post or pilot 74.

A mold ring 80 is provided, the inner surface of which is grooved as indicated at 82 to provide an interlock between the mold ring and a resin mold later to be described. In addition, the mold ring 80 is provided with a downwardly extending annular flange portion 84 having an inwardly facing accurate cylindrical locating surface 86 adapted to cooperate with the outwardly facing accurate cylindrical locating surface 78 of the mold plate 72. It will be observed that the mold ring 80 is supported on the assembly made up of the base plate 70 and the mold plate 72 by engagement between the bottom surface 88 of the flange 84 and the upper surface 90 of the base plate 70.

In preparing the assembly for the production of the hone molds made up by the metal mold ring 80 and the resin mold or mold ring indicated at 92, a highly accurate master gear 94 having the exact shape required of the gear-like honing tool is mounted on the post 74. It will be understood that the master gear may be provided with a central opening 96 which fits closely on the post 74 and which opening is concentric with the outer toothed portion of the master gear to any required degree of accuracy. The metal mold ring 80 is dimensioned so that an annular space of substantial radial dimension is left between the outer toothed periphery of the master gear 94 and the inner grooved surface of the metal mold ring 80.

At this time a fluid resin compound is poured into the annular space between the master gear 94 and the mold ring 80. This resin is selected to have high dimensional stability and is caused to cure while it remains in the aforesaid annular space. A compound including epoxy resin as the major resin component is preferred. It will be observed in FIGURE 10 that the resin mold indicated at 92 includes a bottom surface 98 which rests upon the upper perfectly flat surface 100 of the mold plate 72.

The foregoing operation produces a permanently united mold ring assembly designated 102, made up of the metal mold ring 80 and the resin mold or mold ring 92. The mold ring assembly 102, together with the master gear 94 are removed from the base plate 70 and the mold plate 72 and post 74. Thereafter, the master gear 94 is pressed out of the mold ring assembly 102, leaving the mold ring assembly as a permanent structure which may be used repeatedly for the casting of gear-like hones.

In the production of gear-like hones using the mold ring assembly 102 there is provided a separate support structure including a base plate 110 having thereon a mold plate 112 provided with a central upstanding locating post or pilot 114. The mold plate 112 has an outer accurate cylindrical locating surface 116 and the upper corner thereof is chamfered as indicated at 118, the chamfer being substantially greater than the chamfer 76 provided on the mold plate 72. It will of course be understood that the central locating post or pilot 114 is located in substantially exact concentricity with the outwardly facing cylindrical locating surface 116. The mold plate 112 is slightly thicker in its dimension $d$ than the mold plate 72 for a purpose which will presently appear. The mold plate 112 is provided with an upper flat locating surface 120 exactly perpendicular to the post or pilot 114.

In the production of gear-like honing tools, the mold ring assembly 102 produced by the operation illustrated in FIGURE 10, is mounted on the mold plate 112 as illustrated in FIGURE 13. It will be observed that when this is accomplished, due to the slightly increased thickness of the mold plate 112 as compared to the mold plate 72, the bottom surface 88 of the flange 84 is spaced slightly above the upper surface of the plate 110. This results in the mold ring assembly 102 taking its location vertically by engagement between its bottom locating surface 98 and the upper accurately machined flat locating surface 120 of the mold plate 112. It will further be apparent that the mold ring assembly 102 takes its location laterally with respect to the post 114 by engagement between its inwardly facing locating surface 86 and the outwardly facing accurately formed cylindrical locating surface 116 on the mold plate 112. The relatively large chamfer at 118 on the mold plate 112 provides a clearance space for the lip 122 provided at the underside of the resin mold ring 92 by the relatively small chamfer 76.

With this arrangement the accuracy of location of the mold ring assembly 102 is insured by surfaces thereof which are substantially protected, and are substantially immune from damage due to nicks, burrs and the like.

After the mold ring assembly 102 has been mounted on the mold plate assembly comprising plates 110 and 112, an annular core such as the core illustrated at 16 in FIGURE 9, may be provided which will leave an annular space between the outer periphery of the core and the inner toothed periphery of the resin mold ring 92. The core may be formed of a resin compound, metal or other suitable material. Thereafter, the honing compound, which is a dimensionally stable resin in liquid form, including therein a substantial quantity of abrasive particles, is poured so as to completely fill the annular space between the outer periphery of the core and the inner periphery of the resin mold ring. The core, as illustrated at 16 in FIGURE 9, is preferably provided with a groove or other interlock formation so that when the abrasive containing resin compound of the honing tool is cured it becomes a permanent mechanically interlocked part with the annular core element.

After curing of the abrasive containing resin compound, the core, the cured resin compound of the honing tool, and the mold ring assembly are removed as a unit from the plate assembly comprising plates 110 and 112, and thereafter the completed honing tool is pressed out of the mold ring assembly.

With the foregoing arrangement it will be observed that a plurality of mold ring assemblies 102 may be provided and may be mounted as required on a plate assembly comprising the plates 110 and 112. Inasmuch as the described operation results in substantially exact concentricity between the locating surface 86 of the mold ring assembly and the toothed inner periphery of the mold ring 92, the mold ring assembly may be placed in any angularly displaced position on the plate assembly 110, 112, while maintaining substantially exact concentricity between the locating post 114 and the mold ring assembly.

It is thus possible to provide a multiplicity of different mold ring assemblies 102 each of which may be used with a single plate assembly 110, 112 to provide highly accurate abrasive resin gear-like honing tools.

It is again desired to emphasize the fact that the gear hones, as a result of having the properties requisite for finishing hardened gears and particularly the requisite for having a practical tool life in such an operation, cannot be machined or modified as a practical matter after removal from the mold. Accordingly, it is essential that the high degree of accuracy required for the final finishing operation of hardened gears be built into the master gear and retained by the procedure outlined above so as to reappear in the finished hones.

Inasmuch as an essential requirement of the gear finishing hones is that they shall reproduce with substantially exact faithful accuracy the characteristics of the master gear, it is essential to employ a plastic compound characterized by exceptionally good dimensional stability so that in curing it does not draw away from the mold surfaces. While a number of resins exhibit reasonably good dimensional stability, and would presumably be suitable for use in producing hones, particularly where an exceptional degree of accuracy is not an essential requirement, the resin which has proved to have all the required physical properties in the best proportion is epoxy resin. The required physical properties of the plastic portion 20 of the finished hone are the following: The material must have sufficient hardness to maintain form under load so as to support the abrasive particles to remove the material from high spots on the hardened steel teeth of the gear. Experience has indicated that satisfactory results are obtained in this regard when the plastic portions of the hone have a Rockwell hardness in excess of M70.

The honing operation is normally carried out under coolant, such for example as kerosene, although it may be carried out under water or a light cutting oil. In any case, the addition of coolant tends to maintain the material of the hone reasonably cool and clean. However, as a practical matter the material of the plastic portion of the hone should have a resistance to heat in excess of 200 degrees Fahrenheit. It should also of course be a material which is not affected adversely by the coolant.

In addition to the hardness characteristic of the plastic material, it must have substantial strength to withstand the various stresses to which it is subjected in use. Finally, the material must exhibit substantially perfect resilience since in operation portions of the plastic material surrounding and embedding abrasive grits are required to yield under excessive local pressure to prevent fracture or tearing out of the abrasive grains when over-stressed by high points on the teeth of the hardened gear. As each locally displaced portion of a tooth of the hone moves out of mesh, the resiliency of the plastic material must return the supported grit exactly to its initial position so that upon its next passage it may if called upon take a cut from the tooth of the work gear. It is this combination of hardness which resists displacement of the supported abrasive grits and resiliency which restores the displaced grits or grains repeatedly to exactly predetermined position which is responsible for the long life achieved by the gear finishing hones in practice.

Exceptionally fine results have been obtained when the resin employed in producing the plastic peripheral portion of the hone is a product identified as Marblette Epoxy Casting Resin #602 or #612. These materials, as furnished by the Marblette Company, comprise about equal parts by weight of epoxy resin (a resin which is the product of reacting epichlorohydrin with bisphenol) and which is available from The Bakelite Company or the Shell Chemical Corporation, and a suitable filler such for example as powdered silica. The Marblette Company describes these resins as having the following physical properties: Mold shrinkage 0.0007" per inch; density 110 pounds per cubic foot; tensile strength 8,000 pounds per square inch; compressive strength 19,000 pounds per square inch; flexural strength 10,000 pounds per square inch; hardness Rockwell M100; resistance to heat 200 degress Fahrenheit; impact strength (Izod) 0.5 ft.-lbs./in. notch. To this material as furnished by the supplier, is added a hardening agent and the abrasive grit. Good results have been obtained employing a mixture of twelve parts of the compounded epoxy resin by weight, twelve parts of Carborundum having a grit size 40–120, and one part of a suitable hardener. The hardener or accelerator providing for cold setting, as described above, is described by the supplier of the resin compound as an aliphatic polyamine, such as diethylene triamine.

The Marblette Corporation, supplier of the epoxy resin referred to above, describes the epoxy resin as follows: An epoxy resin suitable for this invention may be produced by reacting epichlorohydrin and bisphenol A in the presence of a sodium hydroxide solution in water. The reaction is carried out at a temperature of about 100 degrees centigrade. After the condensation reaction has taken place, the resin is freed of residual epichlorohydrin and is washed well to remove salt and soluble by-products. The reaction is carried out to produce a reaction product having an average molecular weight of approximately 400. The resin is a liquid. The epoxy value, equiv./100 gm. is 0.50. The hydroxyl groups per molecule are 0.14–0.28.

The specific disclosure in the foregoing has related to the production of external gears of cylindrical type, either spur or helical. It will of course be apparent that the method of finishing hard gears may be accomplished by employing an internal hone in mesh with an external gear, an external gear in mesh with an internal gear, or as specifically described and illustrated in the foregoing, an external hone in conjunction with an external gear. Moreover, the invention is not of course limited to cylindrical gears, but is applicable to tapered gears such as bevel, spiral bevel, hypoid, conical involute, and the like. The method, so far as it relates to the production of externally toothed gear members of any type is as disclosed herein. The only variation noted is that for tapered gears the problem of removal from the mold of the finished hone is facilitated since the initial movement of the hone brings it into complete clearance with respect to the mold, whereas for cylindrical gears of helical type, it is necessary to in effect, screw the hone out of the mold.

For producing internal hones the operation is substantially the same except that it involves the production of a master gear or plastic replica thereof which is adapted to be permanently secured on the locating pilot 24. Also, in this case it is essential to insure concentricity between the mold portion 50 and the pilot 24 so as to also assure concentricity between the outer peripheral surface of the hone and its internal tooth portion, or between an annular member separate from the cast or molded plastic portion and surrounding the plastic portion generally equivalent to the provision of the core 16 in the case of the external hone.

The drawings and the foregoing specification constitute a description of the improved method of making gear finishing tools in such full, clear, concise and exact terms as to enable any person skilled in the art to practice the invention, the scope of which is indicated by the appended claims.

What we claim as our invention is:

1. The method of making highly accurate gear-like honing tools which comprises providing a flat mold plate having an upstanding pilot thereon in exactly centered position relative to a continuous accurate laterally outwardly facing locating surface on said plate, positioning a mold ring having a continuous accurate laterally inwardly facing locating surface in accurate locating engagement with the locating surface on said mold plate, positioning a master gear having an accurately centered hole therein on said pilot, filling the annular space between said mold ring and master gear and above said plate with a fluid dimensionally stable uncured resin compound, treating the toothed periphery of the master gear with a parting agent prior to filling the annular space, curing said resin to form an internal gear-like mold, separating said mold ring and mold as a unit from said mold plate, pilot and master gear with said mold ring extending below the bottom surface of said mold, treating the tooth surfaces of said mold with a parting agent, reassembling said ring and resin mold on a second flat plate having a continuous lateral locating surface and a pilot relatively located identically with the lateral surface and pilot on said mold plate with the lower portion of said mold ring engaging the lateral locating surface on said second plate, and the under surface of said resin mold located on the upper surface of said second plate, filling the annular space within said resin mold with a fluid uncured dimensionally stable resin compound containing abrasive particles, curing the compound to form a gear-like body having a peripheral toothed portion exactly concentric with said pilot, and removing said gear-like body from the mold, plate and pilot.

2. The method as defined in claim 1 which comprises positioning an annular core having a central opening on the pilot of said second plate prior to filling the annular space between said core and pilot with the fluid uncured dimensionally stable resin compound containing abrasive particles.

3. The method of making highly accurate gear-like honing tools which comprises providing a first mold plate assembly having an outwardly facing circular locating surface, an upwardly facing flat mold surface, upwardly facing support means, and a vertical locating pilot of circular cross-section concentric with said circular locating surface and perpendicular to said flat surface, positioning a mold ring on said plate assembly, said mold ring having an inwardly facing circular locating surface engageable with said outwardly facing surface, a downwardly facing surface engageable with said upwardly facing support means and a circular portion extending below said flat mold surface, positioning a master gear on said plate assembly centered on the pilot thereof, filling the annular space between said gear and mold ring and above said flat mold surface with a fluid resin compound to form a resin mold, treating the toothed periphery of the master gear with a parting agent prior to filling the annular space, curing said compound, separating the mold ring and the cured resin mold from the remaining structure to provide a mold ring assembly in which said mold ring has a circular portion extending below the bottom surface of said resin mold, mounting the mold ring assembly on a second plate assembly having an upper flat locating and mold surface, a lateral outwardly facing circular locating surface, and a pilot perpendicular to said flat surface and relatively located identically with the pilot on said first plate assembly to the lateral surfaces thereof with the underside of the cured resin mold located on the flat surface of said second plate assembly, treating the tooth surfaces of said mold with a parting agent, locating said mold ring assembly on said second plate assembly solely by engagement between the inwardly facing lateral locating surface of said mold ring with the lateral outwardly facing surface of said second plate assembly and engagement between the underside of said resin mold and the upwardly facing flat surface of said second plate assembly, filling the annular space within said resin mold with a fluid resin compound containing abrasive particles, curing the compound, and separating the cured compound from the resin mold.

4. The method as defined in claim 3 which comprises positioning an annular core over the pilot of said second plate assembly prior to filling the annular space between said core and the resin mold with a fluid resin compound containing abrasive particles.

5. The method as defined in claim 4 in which the top circular corner of said second plate assembly is chamfered to provide clearance at the interior corner provided between the flat bottom surface of the resin mold and the inner circular locating surface of the mold ring.

6. The method of making gear-like hones which comprises providing a first mold plate assembly including a disc having a flat horizontal top surface, a vertical cylindrical side surface and a vertical cylindrical post concentric with said side surface, positioning a mold ring on said plate assembly, said ring having an inner cylindrical surface closely fitting around said disc and extending above the horizontal top surface thereof, positioning a master gear on said plate assembly, said gear having a center hole fitting closely around said post, filling the annular cavity between said gear and ring and above said horizontal top surface with a fluid uncured resin compound, treating the toothed periphery of the master gear with a parting agent prior to filling the annular space, curing the compound to form a resin mold within said mold ring interconnected to form a mold ring assembly with said mold ring extending below said resin mold, separating the mold ring assembly from the remaining structure, providing a second plate assembly having a flat horizontal top surface, a vertical cylindrical side surface of precisely the same diameter as that of the disc of said first plate assembly, and a vertical post concentric with said last named cylindrical surface, positioning said mold ring assembly on said second plate assembly located thereon solely by engagement between the cylindrical surfaces thereof and the engagement between the bottom surface of said resin mold and the flat horizontal surface of said second plate assembly, filling the annular space within said resin mold with a fluid resin compound containing abrasive particles, curing the compound, and separating the cured compound from the resin mold.

7. The method as defined in claim 6 which comprises positioning an annular core over the said pilot of said second plate assembly prior to filling the annular space between said core and the resin mold with a fluid resin compound containing abrasive particles.

8. The method of making a mold ring assembly comprising the step of providing a mold plate having a flat horizontal upper surface, a cylindrical peripheral surface, and a vertical pilot perpendicular to said flat surface and concentric with said cylindrical peripheral surface, positioning a cylindrical mold ring having a cylindrical opening shaped to fit closely around said plate and to extend thereabove with its lower edge portion extending below the flat upper surface, positioning a master gear on said pilot and against said flat surface, filling the annular space between said mold ring and master gear with a fluid dimensionally stable uncured resin compound, treating the toothed peripheral portion of the master gear with a parting agent prior to filling the annular space, curing the resin to form an internally toothed mold, separating the mold ring and mold as a unit from the gear plate and pilot to provide a mold assembly in which the mold ring extends beyond the lower surface of said mold to provide an interior cylindrical locating surface therefor.

References Cited by the Examiner
UNITED STATES PATENTS

| | | | |
|---|---|---|---|
| 251,260 | 12/1881 | Lockwood | 264—271 |
| 283,795 | 8/1883 | Lockwood | 264—271 |
| 445,932 | 2/1891 | Murnane et al. | 264—220 |
| 587,961 | 8/1897 | Hardman | 18—34 |
| 643,422 | 2/1900 | McFarland | 18—34 |
| 1,038,115 | 9/1912 | Gillies | 18—47 |
| 2,856,637 | 10/1958 | Daniel | 264—220 |
| 2,860,947 | 11/1958 | Kalat | 18—47 |
| 2,980,966 | 4/1961 | Praeg | 264—318 |

FOREIGN PATENTS

| | | |
|---|---|---|
| 739,253 | 10/1955 | Great Britain. |

ROBERT F. WHITE, *Primary Examiner.*

ALEXANDER H. BRODMERKEL, *Examiner.*